April 29, 1930.  C. Q. PAYNE  1,756,907
ELECTROMAGNETIC CLUTCH
Filed June 9, 1928  2 Sheets-Sheet 1
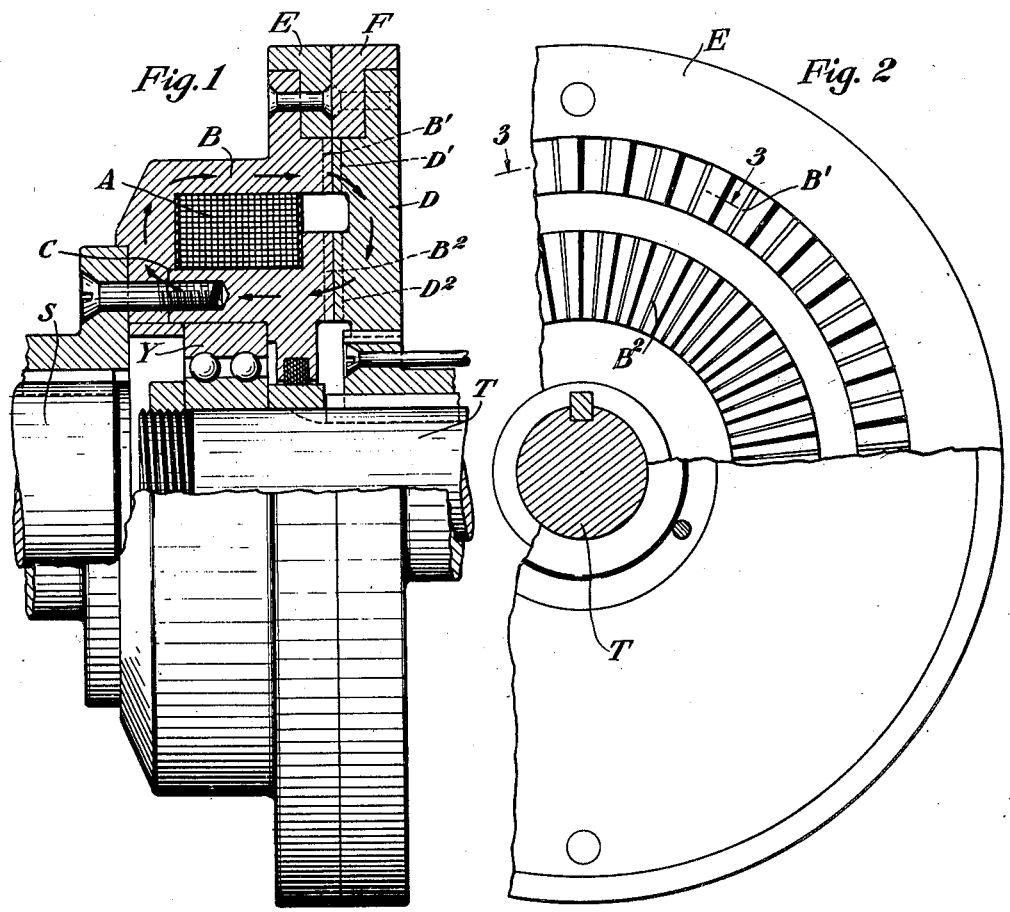
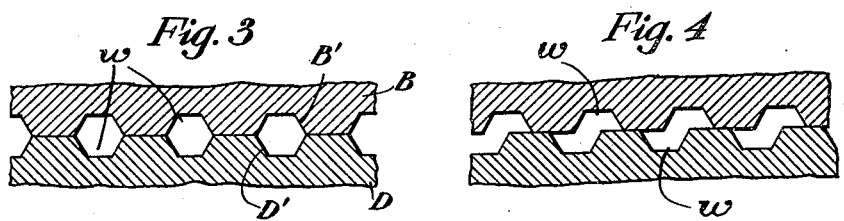
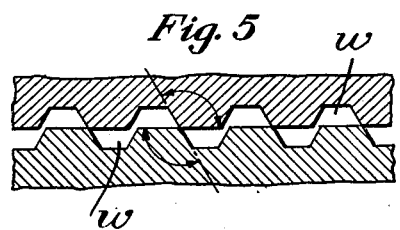
INVENTOR
Clarence Q. Payne,
BY
ATTORNEYS April 29, 1930. C. Q. PAYNE 1,756,907
ELECTROMAGNETIC CLUTCH
Filed June 9, 1928  2 Sheets-Sheet 2

INVENTOR
Clarence Q. Payne,
BY
ATTORNEYS

Patented Apr. 29, 1930

1,756,907

UNITED STATES PATENT OFFICE

CLARENCE Q. PAYNE, OF STAMFORD, CONNECTICUT, ASSIGNOR OF ONE-FOURTH TO J. GOODWIN HALL, OF NEW YORK, N. Y.

ELECTROMAGNETIC CLUTCH

Application filed June 9, 1928. Serial No. 284,171.

This invention relates to improvements in electromagnetic clutches, and similar electromagnetic engaging devices such as brakes, etc., whereby increased operating efficiency and also greater durability of the engaging members is obtained.

It is an object of the invention to provide means whereby the functions of the clutch are brought more perfectly under control to secure an increased sliding resistance of the magnetized contact surfaces, and also a smooth engagement, or pick-up, when employing local condensations of the magnetic density along said surfaces in the manner set forth in my Patents Nos. 1,519,417 and 1,622,261.

Another object of the invention is to provide a means for controlling and diminishing the wear of the clutch members due to their relative motion upon engagement while pressed together with the tractive force of the electromagnet.

Various other objects and advantages will appear as the description proceeds.

Figure 6:
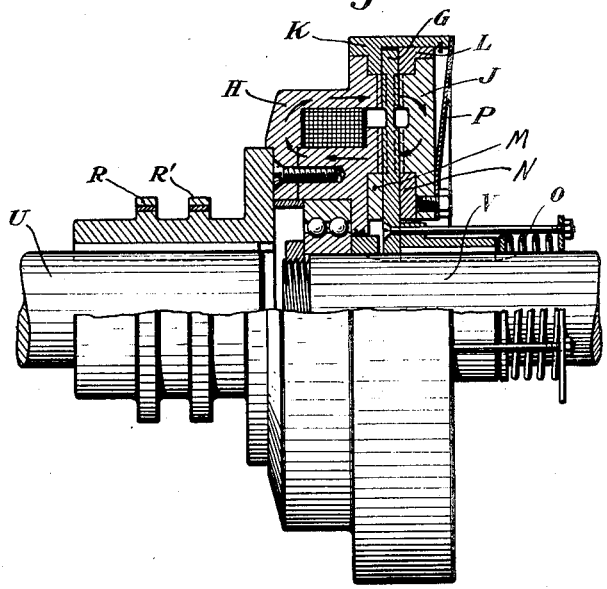
Figure 7:
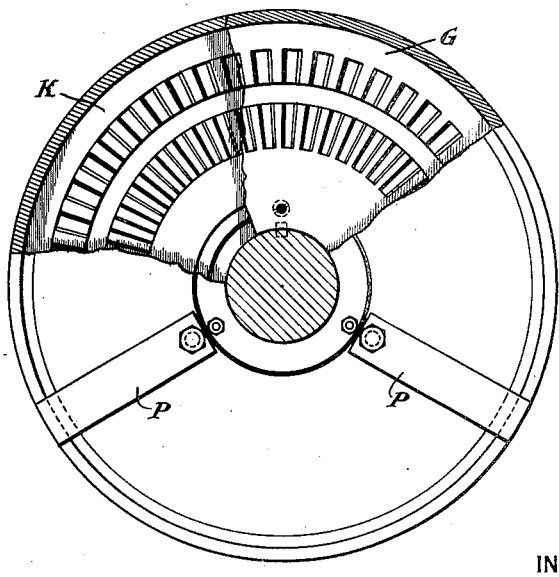

In the accompanying drawings showing preferred embodiments of the invention, Figures 1 and 2 show in part sectional longitudinal and end views a magnetic clutch coupling which illustrate application of the present invention. Figures 3, 4 and 5 are sectional views on the line 3—3 of Figure 2 showing in enlarged scale the grooved contact surfaces of the clutch members. Figures 6 and 7 show in sectional views certain structural modifications of the above application of the invention.

In my Patent No. 1,519,417 I have described and claimed broadly means for increasing the sliding resistance of surfaces in magnetic contact, or in exceedingly close proximity, by establishing wide differences of magnetic density, or flux distortion, at numerous points along the plane of contact of the surfaces.

In my Patent No. 1,622,261 I have described and claimed among other features means for increasing the efficiency of the above invention by employing expanded polar areas of the electromagnet as compared with its core areas, whereby a more effective use of the local concentrations of magnetic density is obtained.

In my present invention I make use of numerous local concentrations of magnetic density by means of radial grooves on both sides of the plane of contact of the engaging members, and also employ annular pressure areas to support the tractive pull of the electromagnet, which are independent of the torque producing areas. In this way I am able to so shape and place the radial grooves in relation to each other that the maximum torque can be obtained from the magnetic flux circuit, while at the same time a smooth engagement or pickup of the engaging members is made possible while they are in relative motion when the clutch is energized.

In Figures 1 and 2 A represents the energizing field coil of the bipolar electromagnet B. The latter may be conveniently constructed in two parts with a joint at C, to enable the inner pole surface $B^2$ to be expanded as shown in order to support the field coil, and also to secure as large a mean effective driving radius as possible for the two annular polar surfaces. The electromagnet B is mounted upon a suitable hub, which is keyed to the shaft S and provides a bearing support Y for the end of the shaft T. The armature disc plate D is slidably keyed to the shaft T in close proximity to the electromagnet, so that when the field coil A is energized the plate D is drawn into contact engagement with the pole faces $B^1$ $B^2$ of the electromagnet, and the sliding resistance of the magnetized surfaces then develops sufficient torque to lock the engaging members, thus coupling the two shafts S and T together through the clutch.

In my present invention the contact surfaces of the engaging members are each provided with torque producing areas $B^1$ $B^2$ and $D^1$ $D^2$ and also separate pressure supporting areas which are respectively brought into contact when the clutch is energized. In Figure 1, E and F represent in sectional view separate annular pressure rings whose inner faces are preferably in the same plane as that of the pole faces $B^1$ and $B^2$ when brought together by the tractive pull of the electromagnet. The pressure supporting surfaces E and F are independent of the magnetic circuit of the electromagnet shown by the broken line in Figure 1. They form in effect bearings, and their areas are so proportioned that the pressure per square inch which they support is reduced to the limit of good bearing practice in order to avoid over-heating and cutting while they slide upon each other during the period of pick up when the clutch is slipping and before it locks.

The pole faces $B^1 B^2$ and also the armature faces $D^1 D^2$ are preferably provided with grooves or depressions W whose axes are placed radially with respect to the engaging surfaces. The edges of the grooves also occupy radial positions and preferably form obtuse angles with the faces of the poles as indicated in Fig. 5 in order to increase the carrying capacity of the lines of force at their engaging edges. By reason of the separate pressure surfaces E and F it thus becomes possible to place the grooves quite close together as shown in the enlarged views in Figures 3, 4 and 5, and to make their mean width somewhat greater than that of the intervening tooth projections without danger of interlocking or of too great wear on the engaging faces of the poles. As one engaging member moves relatively to the other, the teeth on the two sides of the plane of contact occupy successively the position shown in Figures 3, 4 and 5. When the teeth are superposed as shown in Figure 3 they then present the greatest metal to metal contact area, and in this position offer the least magnetic reluctance, and secure the maximum flux for a given magneto-motive force. As the teeth assume the positions shown in Figure 4, the magnetic reluctance increases due to the constriction of their contact areas until in the position shown in Figure 5 when the metal to metal contact between the teeth is momentarily broken, the magnetic reluctance then becomes a maximum. This position is only attained by making the mean width of the grooves somewhat greater than that of the teeth and so placing them that all their edges engage along radial lines.

When the engaging members of the clutch move relatively to each other the effect of introducing and withdrawing a series of small air gaps in the magnetic circuit is to change or vary the magnetic reluctance of the circuit. This change of reluctance is strongly resisted by the flux circuit of the electromagnet and this resistance increases the torque of the clutch. The amount of the reluctance and its effect upon the starting torque will also depend upon the width and depth of the grooves and these can be varied to meet different clutch requirements.

The other elements besides variable reluctance which combine to form the torque of the clutch include flux distortion, and friction due to the tractive pull of the electromagnet. The former is a maximum when the teeth occupy edge relations as shown in Figure 5, and is preferably accomplished by so disposing the edges of the grooves with respect to the clutch faces, that the respective groove-edges of the opposing surfaces coincide throughout their lengths and register with each other when brought into contact engagement. The friction due to the tractive pull of the magnet, in accordance with my present invention, is supported mainly by the separate annular pressure rings E, F, Figures 1 and 2, which are independent of the torque producing areas $B^1$ and $B^2$, and whose contact surfaces preferably meet in the same plane as that of the pole faces $B^1 B^2$.

The pressure ring E is preferably made of iron or steel while the pressure ring F is preferably made of bronze. The pole faces $B^1 B^2$ of the electromagnet which is made of soft iron in order to obtain a high magnetic permeability, are preferably made glass hard by carburizing them in order to resist wear. The face of the ring E is likewise hardened for the same reason. The surfaces of the iron armature D which oppose the pole faces $B^1 B^2$ need not be hardened since they and the bronze ring F should be of about the same degree of hardness so as to absorb whatever wear may develop from the operation of the clutch. The durability of the clutch is thus assured since the pole faces of the electromagnet, which is the more expensive of the two engaging members, are thus protected against wear, and a certain amount of wear of the contact faces of the armature, which is the less expensive of the two members, does not reduce the efficiency of the clutch.

Instead of placing the pressure rings as shown in Figures 1 and 2 on the outside of the pole faces of the electromagnet, they may also be placed inside thereof when it is desirable to obtain the maximum mean effective driving radius for the torque areas. It is also possible to place a pressure ring between the pole faces or one may be placed both inside and outside of the pole areas so as to subdivide their total area and bring them close to the pole face areas. This latter arrangement of the pressure rings is shown in sectional side and end views in Figures 6 and 7. These views also illustrate an application of my invention to a shaft coupling. In this case a light magnetic disc-plate G is mounted between the electromagnet H and its armature J in order to increase the contact areas of the engaging members and also the torque of the clutch. Here the outer pressure ring K is provided with an expanded driving sleeve which slidably supports the outer edge of the pressure ring L which is attached to the armature J. The annular pressure rings M and N are respectively attached to the electromagnet and armature at their inner circumferences as shown in Figures 6 and 7. The hub of the disc plate G is slidably mounted by means of keys and keyways upon the shaft V. Both the disc plate G and the armature J are respectively held out of contact engagement with each other, and with the electromagnet H, by means of the spiral spring O and the spring plate P. The outer and inner annular torque areas of the disc plate G, as well as the opposing pole faces of the electromagnet H, and those of the armature J are provided with radial grooves as shown in Figure 7, similar to those illustrated in Figures 3, 4 and 5, so spaced that their edge relations secure the maximum flux distortion and sliding resistance in the manner already explained in connection with Figures 1 and 2.

Electric current to energize the electromagnet is conveyed to it by means of insulated collector rings R R¹ from contact brushes connected with an outside source of power. When energized the disc-plate is brought into contact engagement with the electromagnet and the armature with the disc plate. Those annular areas of each opposite the pole faces then form parts of the same magnetic circuit as indicated by the broken line joining them. So energized power can then be transmitted from the shaft U to the shaft V through the magnetic clutch.

By thus separating the functions of the clutch so that the pressure supporting areas are independent of the torque producing areas, and then designing each of these areas for the specific duty it has to perform, it is possible to construct not only a very powerful and efficient clutch having a smooth engagement or pick up, but also one which is durable and resists wear of the contact surfaces when subjected to rubbing action due to frequent engagements.

Other applications and adaptations of my invention will be apparent to those skilled in the art.

Having thus described my invention, what I claim as new and desire to secure by Letters Patent is:

1. An electromagnetic engaging device comprising a bipolar electromagnet and an armature having contact engaging surfaces made up of separate areas rigidly connected, part of said areas comprising the bipolar areas disposed on the magnetic flux circuit of said electromagnet having grooves with radially disposed edges, and part of said areas being pressure areas independent of said magnetic circuit, in combination with means for bringing said surfaces into contact engagement with each other.

2. In an electromagnetic engaging device a driving and a driven member comprising an electromagnet and an armature having contact engaging surfaces made up of torque producing areas which are separate from and rigidly connected with pressure supporting areas, said torque producing areas having grooves with radially disposed edges, and said pressure areas being independent of the magnetic circuit of said electromagnet and having a non-magnetizable metal at their contact plane supporting the thrust of said electromagnet, in combination with means for bringing said surfaces into contact engagement with each other.

3. In an electromagnetic engaging device, a driving and a driven member comprising a bipolar electromagnet and an armature having contact engaging surfaces made up of torque producing areas which are separate from and rigidly connected with pressure supporting areas, said torque producing areas having grooves with radially disposed and obtuse-angled edges, and said pressure areas having a non-magnetizable metal at their contact plane supporting the thrust of said electromagnet in combination with means for bringing said surfaces into contact engagement with each other.

4. An electromagnetic engaging device comprising a bipolar electromagnet and an armature whose polar faces are greater in area than the combined cross sectional core areas of said electromagnet and which have contact engaging surfaces composed of separate areas rigidly connected, part of said areas comprising the bi-polar areas disposed on the same magnetic flux circuit of said electromagnet and provided with grooves having radially disposed edges, and part of said areas being ungrooved and independent of said magnetic circuit, in combination with means for bringing said surfaces into contact engagement with each other.

5. An electromagnetic engaging device comprising a bipolar electromagnet and an armature which have contact engaging surfaces composed partly of bipolar areas disposed on the same magnetic flux circuit of said electromagnet and provided with grooves having radially disposed edges, and partly of ungrooved areas independent of said magnetic circuit, said combined areas of each surface forming a single rigidly connected pressure plane, in combination with means for bringing said surfaces into contact engagement with each other.

6. In an electromagnetic clutch, a driving member comprising a bipolar electromagnet and an armature slidably connected to said electromagnet at its outer circumference, a driven member comprising a magnetizable disc slidably mounted at its inner circumference between said electromagnet and armature, each of said members having two contact engaging surfaces respectively composed of torque producing areas rigidly connected with pressure supporting areas, said torque producing areas comprising the bipolar areas disposed on the magnetic flux circuit of said electromagnet and provided with grooves having radially disposed edges, and said pressure supporting areas being ungrooved and independent of said magnetic circuit, in combination with means for bringing the surfaces of said members in contact engagement with each other.

7. In an electromagnetic clutch, a driving member comprising a bipolar electromagnet and an armature slidably connected to said electromagnet at its outer circumference, a driven member comprising a magnetizable disc slidably mounted at its inner circumference between said electromagnet and armature, each of said members having two contact engaging surfaces respectively composed of torque producing areas rigidly connected with pressure supporting areas, said torque producing areas comprising the bipolar areas disposed on the magnetic flux circuit of said electromagnet and provided with grooves having radially disposed edges, and said pressure supporting areas being ungrooved and having a non-magnetizable metal at their contact plane, said combined torque and pressure areas of each of said contact surfaces forming a single plane, in combination with means for bringing the surfaces of said members into contact engagement with each other.

8. An electromagnetic engaging device comprising a bipolar electromagnet and an armature having contact engaging surfaces made up of separate areas rigidly connected, part of said areas comprising the bipolar areas having a series of groove-edges so disposed that those of the opposing surfaces will respectively coincide with each other throughout their lengths and register when brought into contact engagement, and part of said areas being pressure areas independent of the magnetic circuit of said electromagnet and means for bringing said surfaces into contact engagement with each other.

In testimony whereof I have affixed my signature to this specification.

CLARENCE Q. PAYNE.